United States Patent [19]

Rudolph

[11] Patent Number: 5,783,911
[45] Date of Patent: Jul. 21, 1998

[54] CIRCUIT ARRANGEMENT FOR OPERATING ELECTRIC LAMPS, AND OPERATING METHOD FOR ELECTRIC LAMPS

[75] Inventor: Bernd Rudolph, München, Germany

[73] Assignee: Patent-Treuhand-Gesellschaft fuer elektrische Gluehlampen mbH, Munich, Germany

[21] Appl. No.: 674,072

[22] Filed: Jul. 1, 1996

[30] Foreign Application Priority Data

Jul. 12, 1995 [DE] Germany ............ 195 25 123.7
Jul. 17, 1995 [DE] Germany ............ 195 26 039.2

[51] Int. Cl.$^6$ ............ H05B 41/00; H05B 41/14
[52] U.S. Cl. ............ 315/225; 315/119; 315/DIG. 7; 315/313; 315/209 R; 363/50
[58] Field of Search ............ 315/DIG. 7, 119, 315/225, 209 R, 313; 363/50, 22

[56] References Cited

U.S. PATENT DOCUMENTS 4,811,186 3/1989 Vargo .................. 363/22
5,122,712 6/1992 Hirschmann ............ 315/106

FOREIGN PATENT DOCUMENTS

| A-0146683 | 3/1985 | European Pat. Off. |
| A-0276460 | 3/1988 | European Pat. Off. |
| 4334076A1 | 6/1995 | Germany. |
| A-4334076 | 12/1995 | Germany. |

Primary Examiner—Arnold Kinkead

[57] ABSTRACT

The invention relates to a circuit arrangement for operating electric lamps, and an operating method for electric lamps. The circuit arrangement has an inverter ((Q1, Q2) with a switch-off device which switches off the inverter (Q1, Q2) in the case of an anomalous operating state. The switch-off device has a field-effect transistor (T1, T1') whose drain-source junction is arranged in the control circuit of an inverter switching transistor (Q2) and switches the control circuit of the inverter transistor (Q2) between a state which is of low resistance in normal operation and a state which is of high resistance in anomalous operation. After the occurrence of an anomalous operating state, it is advantageous to switch off synchronously with the blocking phase of the inverter transistor (Q2) in whose control circuit the field-effect transistor (T1, T1') is arranged.

17 Claims, 2 Drawing Sheets

5,783,911

1

CIRCUIT ARRANGEMENT FOR OPERATING ELECTRIC LAMPS, AND OPERATING METHOD FOR ELECTRIC LAMPS

BACKGROUND OF THE INVENTION

This patent application is an application additional to the German patent application with the Application No. 19525123.7.

The invention relates to a circuit arrangement for operating electric lamps, and to an operating method for electric lamps.

Such a circuit arrangement is disclosed, for example, in the patent specification EP-B 0 276 460. It serves the purpose of operating a low-pressure discharge lamp and has an inverter which comprises two alternately switching transistors arranged in a half-bridge. This circuit arrangement has a safety shutdown which shuts down the inverter in the case of anomalous operation. The switch-off device essentially comprises a thyristor which is connected in parallel with the control electrode of a switching transistor of the inverter, and a Zener diode which controls the gate of the thyristor. In the case of an anomalous operating state, the thyristor switches through and extracts the control signal from a switching transistor of the inverter and thus effects a shutdown of the circuit arrangement. The implementation of this safety shutdown requires a surge-proof thyristor and a plurality of ohmic resistors of relatively high volume and with a loadability of a few watts, which serve the purpose of current limitation in the switch-off case and of generating the thyristor holding current. Moreover, it is necessary to use very robust transistors for the half-bridge, only in order to withstand the load during the switching-off operation.

Offenlegungsschrift DE 43 34 076 likewise describes a circuit arrangement corresponding to the preamble of Patent claim 1. It comprises a current feedback half-bridge inverter which is equipped with a switch-off device which switches off the inverter in the case of a defective lamp by extracting the control signal from a transistor of the inverter. The switch-off device contains as essential elements a field-effect transistor, which is connected in parallel with the control electrode of the transistor, a bistable multivibrator which drives the gate of the field-effect transistor, and a trigger via which the bistable multivibrator is reset in the case of a defective lamp, which has the effect of switching through the field-effect transistor and thus of switching off the inverter. A disadvantage of this circuit arrangement consists in that as a consequence of the freewheeling diode which is necessarily present in the field-effect transistor for technical reasons, the switch-off device causes an asymmetric drive of the inverter transistors. Moreover, particularly in the case of high operating temperatures of the inverter transistors there is the risk that the voltage present at the control junction of the inverter transistor to be switched off exceeds the base-emitter threshold voltage of said transistor during the switching-off operation, with the result that this inverter transistor is not reliably switched off, but instead operates in the linear range and can be destroyed.

SUMMARY OF THE INVENTION

It is the object of the invention to provide a circuit arrangement for operating electric lamps which has a switch-off device which is improved by comparison with the prior art mentioned above and which acts in the case of an anomalous operating state and switches off the inverter, and also to specify an improved operating method for electric lamps.

2

The two circuit arrangements described above as prior art have a switch-off device for the inverter which is based on the same fundamental principle. In the case of an anomalous operating state, the two switch-off devices extract the control signal from one of the half-bridge inverter transistors, by connecting a shunt in parallel with the control junction. The invention adopts a different approach.

In the circuit arrangement according to the invention, the switch-off device for the inverter has a switch-off transistor whose switching junction is an active serial element of the control circuit of one of the inverter transistors, that is, an element across which the entire control current of this inverter transistor flows in normal operation of the inverter. The switch-off transistor is preferably a field-effect transistor which can be driven without power losses. The term control circuit is taken here to mean that circuit in which the control junction of the above-mentioned inverter transistor is arranged. If this inverter transistor is a bipolar transistor, the control junction is the base-emitter junction of the inverter transistor, and the control circuit is the base-emitter circuit in which the control current, that is to say the base current, of the inverter transistor flows. If this inverter transistor is a field-effect transistor, the control junction is the gate-source junction of the inverter transistor and the control circuit is the gate-source circuit in which the control current, that is to say the gate current, of the inverter transistor flows. The entire control circuit of the relevant inverter transistor is switched between a low-resistance state—which corresponds to normal operation—and a high-resistance state—in the case of an anomalous operating state—with the aid of the switch-off transistor belonging to the switch-off device. In this case, the switching junction of the switch-off transistor of the switch-off device is arranged either in the emitter line or source line of the relevant inverter transistor (first exemplary embodiment of the invention) or else in the base line or gate line of the corresponding inverter transistor (second exemplary embodiment of the invention). In the case of an anomalous operating state, this arrangement according to the invention of the switch-off transistor of the switch-off device ensures for the inverter a reliable switching-off which still functions acceptably even in the case of high operating temperatures of the inverter, that is to say up to the maximum permissible crystal temperature of the inverter transistors and of the switch-off transistor.

During normal operation, the switching junction—that is to say the drain-source junction—of the switch-off transistor of the switch-off device, and thus also the control circuit of the relevant inverter transistor are of low resistance. After the occurrence of an anomalous operating state, the switching junction of the switch-off transistor, and thus also the control circuit of the relevant inverter transistor are of high resistance. This switchover into the high-resistance state is preferably performed synchronously with the blocking phase of the corresponding inverter transistor with which the field-effect transistor is interconnected. As a result, the switching transistors of the inverter are reliably switched and only slightly loaded during the switching-off operation, which is initiated by an error signal monitoring element.

It is advantageous for the switch-off device according to the invention to have a bistable switching device whose input is driven by the error signal monitoring element, via a trigger and/or time-delay switch, and whose output is connected to the control electrode—that is to say the gate electrode—of the switch-off transistor, and which ensures by guiding the supply current via a lamp electrode that the inverter cannot build up again until the exchange of the defective lamp or until the circuit arrangement is switched on again. A thyristor, or an equivalent thyristor circuit constructed from two transistors, or a flip flop are advantageously suitable as the bistable switching device. The above-mentioned equivalent thyristor circuit and the flip flop have the advantage that they can be implemented using integrated C-MOS technology.

The switching-off signal is advantageously formed by two components superimposed on one another. The error signal monitoring element, which is connected in parallel in terms of alternating current with the lamp or lamps and monitors the lamp voltage, generates a direct voltage which is proportional to the lamp voltage. This direct voltage forms the first component of the switching-off signal. It is advantageous further to superimpose on said direct voltage a synchronization signal which is generated by a synchronization device which is a component of the error signal monitoring element and which forms the second component of the switching-off signal. This synchronization signal is advantageously proportional to the temporal change in the voltage at the centre tap of the inverter switching transistors or to the time derivative of the inverter output voltage. As a result, the synchronization device ensures that the switching-off occurring in the case of a fault is performed during the blocking phase of that inverter transistor in the control circuit of which the switch-off transistor of the switch-off device is arranged.

The error signal monitoring element advantageously has a capacitor, a rectifier diode and an RC integration element. The synchronization device advantageously contains a CR series circuit which is connected to the centre tap of the inverter and to the capacitor of the error signal monitoring element as well as to the input of the bistable switching device via a trigger and/or time-delay switch.

BRIEF DESCRIPTION OF THE DRAWINGS

The invention is explained in more detail below with the aid of two preferred exemplary embodiments.

BEST MODE FOR CARRYING OUT THE INVENTION

The two exemplary embodiments differ from one another only in the arrangement of the switch-off transistors T1, T1' of the switch-off device according to the invention. For this reason, the same reference symbols are used in FIGS. 1 and 2 for the identical components of the two exemplary embodiments.

Figure 1:
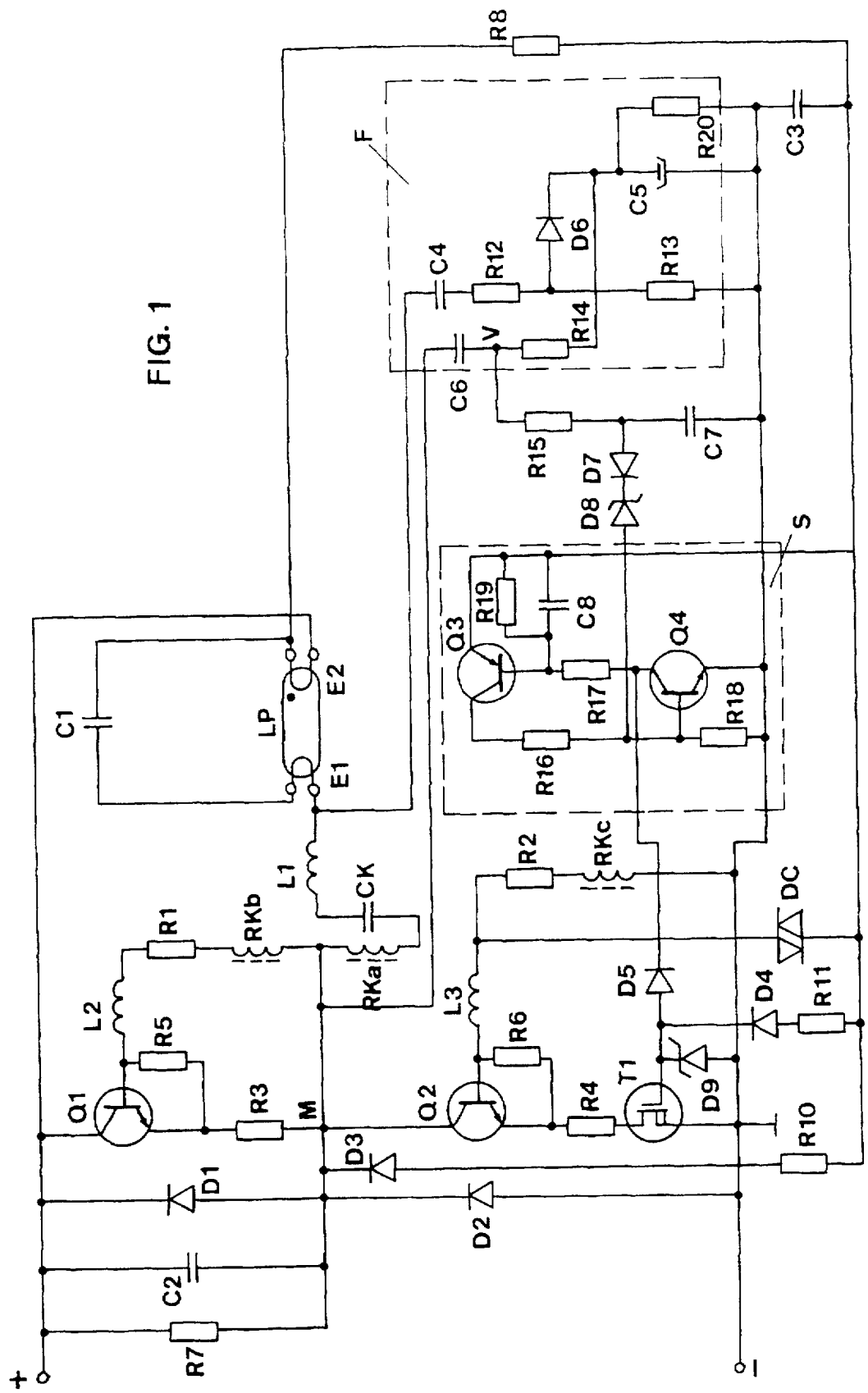
FIG. 1 shows a sketched circuit diagram of the circuit arrangement according to the invention in accordance with the first exemplary embodiment.

The circuit arrangement, illustrated in FIG. 1, in accordance with the first exemplary embodiment serves the purpose of operating a 58 W fluorescent lamp LP. This circuit arrangement has a half-bridge inverter fitted with two bipolar transistors Q1, Q2. The two bipolar transistors Q1, Q2 are each equipped with a freewheeling diode D1, D2, which are connected in parallel to the collector-emitter junction of the appropriate transistor Q1, Q2. In addition, the two bipolar transistors Q1, Q2 each have an emitter resistor R3, R4 and a base-emitter parallel resistor R5, R6. Furthermore, an ohmic resistor R7 and a capacitor C2 are connected in parallel with the collector-emitter junction of the transistor Q1. The two switching transistors Q1, Q2 of the half-bridge are driven by means of a toroidal-core transformer which has a primary winding RKa and two secondary windings RKb, RKc. The primary winding RKa is integrated into the series resonant circuit of the half-bridge inverter, which is connected to the centre tap M of the inverter and contains the coupling capacitor CK, the resonant inductor L1 and the resonant capacitor C1. The secondary windings RKb, RKc are each integrated into the base-emitter circuit of an inverter transistor Q1, Q2 and connected in each case via a base series resistor R1, R2 and an inductor L2, L3, to the base terminal of the relevant bipolar transistor Q1, Q2. The half-bridge inverter further has a starting device which essentially comprises the diac DC and the starting capacitor C3. The diac DC is connected via the inductor L3 to the base terminal of the inverter transistor Q2. The starting capacitor C3 is connected to the negative pole of the inverter direct voltage supply and, via an ohmic resistor R10 and a rectifier diode D3, to the centre tap M of the half-bridge.

The fluorescent lamp LP to be operated is connected in parallel to the resonant capacitor. One connection of the first electrode filament E1 of the lamp LP is connected to the resonant inductor L1, while the other connection of the first electrode filament E1 is connected to the resonant capacitor. One connection of the second lamp electrode filament E2 is led to the positive pole of the inverter direct voltage supply, and the other connection of the second lamp electrode filament is connected via an ohmic resistor R8 to the negative pole of the inverter direct voltage supply.

To this extent, the circuit arrangement corresponds to a half-bridge inverter such as is described, for example, on pages 62–63 of the book "Schaltnetzteile" ("Switched-mode power supplies") by W. Hirschmann—A. Hauenstein, publisher Siemens AG. After switch-on, the starting capacitor C3 is charged to the breakdown voltage of the diac DC, which then generates triggering pulses for the base of the bipolar transistor Q2, and thereby causes the half-bridge inverter to build up. After switching-through of the transistor Q2, the starting capacitor C3 is charged via the resistor R10 and the diode D3 to such an extent that the diac DC generates no further triggering pulses. The two inverter transistors Q1, Q2 switch alternately, with the result that the centre tap M of the half-bridge is alternately connected to the positive or negative pole of the direct voltage supply. The recharging of the coupling capacitor CK occasioned thereby causes in the series resonant circuit in the lamp LP a medium-frequency alternating current whose frequency corresponds to the operating frequency of the half-bridge inverter.

Connected in the emitter line of the second half-bridge transistor Q2 is a field-effect transistor T1 which serves as switch-off transistor for the inverter and is an essential component of the switch-off device according to the invention. The drain of this field-effect transistor T1 is connected via the emitter resistor R4 to the emitter of the switching transistor Q2. The source terminal of the field-effect transistor T1 is connected to the negative pole of the direct voltage supply of the inverter. In normal operation, the drain-source junction of the field-effect transistor T1, and thus also the base-emitter circuit of the bipolar transistor Q2, are of low resistance. The base-emitter circuit of the bipolar transistor Q2 contains the secondary winding RKc of the toroidal-core transformer, the base series resistor R2, the inductor L3, the base-emitter junction of the bipolar transistor Q2, the emitter resistor R4 and the drain-source junction of the field-effect transistor T1. Upon switching on the circuit arrangement, the field-effect transistor T1 is controlled in a low-resistance fashion before starting of the inverter via the closing resistor R11 and diode D4, which is led to the gate of the field-effect transistor T1. The gate of the field-effect transistor T1 is, furthermore, connected via a diode D5 to the output of a bistable switching device S whose input is connected, for its part, to the output of an error monitoring element F connected parallel to the lamp LP in terms of alternating current. A Zener diode D9 which limits the voltage drop to approximately 12 V is connected in parallel with the gate-source junction of the field effect transistor T1. The aforesaid bistable switching device S and the error monitoring element F likewise belong to the switch-off device according to the invention, which in the case of an anomalous operating state controls the field-effect transistor T1 and thus also the base-emitter circuit of the inverter transistor Q2 to be of high resistance. The oscillation of the half-bridge inverter is thereby interrupted. Switching off is performed synchronously with the blocking phase of the switching transistor Q2. The switch-off signal is composed additively of two voltage components.

The first voltage component is a smoothed voltage which is proportional to the lamp voltage. This voltage component is generated with the aid of the RC integration element R12, R13, C4, the rectifier diode D6 and the capacitor C5. These aforementioned components R12, C4, R13, C5, D6 are arranged in parallel in terms of alternating current with the discharge path of the lamp LP. One terminal of the capacitor C4 is connected to the electrode filament E1 of the lamp, while its other terminal is led via the resistors R12, R13 to the source terminal of the field-effect transistor T1 and to the negative pole of the inverter direct voltage supply. A branch point located between the resistors R12, R13 is connected via the rectifier diode D6 to a pole of the capacitor C5. The other pole of the capacitor C5 is connected to the negative pole of the inverter direct voltage supply. The voltage divider R12, R13 divides the voltage present at the lamp LP. This downwardly divided voltage signal is fed to the capacitor C5 via the rectifier diode D6 and integrated in the capacitor C5. The capacitor C5 smoothes this voltage signal, with the result that a direct voltage which is proportional to the lamp voltage is present at the capacitor C5. This smoothed direct voltage forms the first component of the switching-off signal.

The second component of the switching-off signal is a synchronization signal which is proportional to the time derivative of the inverter output voltage at the centre tap M and which is generated by a synchronization device which is a component of the error monitoring element. The synchronization device essentially comprises a CR series circuit C6, R14, which forms a CR differentiating element C6, R14. The capacitor C6 of the differentiating element is directly connected to the centre tap M of the half-bridge, while the resistor R14 of the differentiating element is directly connected to a pole of the capacitor C5. The centre tap V of the differentiating element C6, R14 is led via a lowpass filter R15, C7, a rectifier diode D7 and a Zener diode D8 to the input of the bistable switching device. The differentiating element C6, R14 differentiates the trapezoidal output voltage, present at the centre tap M, of the inverter and thereby generates at the resistor R14 a square-wave voltage, which forms the second component of the switching-off signal. The positive half wave of the square-wave voltage is generated by the rising edge, and the negative half wave of the square-wave voltage is generated by the falling edge of the trapezoidal inverter output voltage. The rising edge of the trapezoidal inverter output voltage forms at the beginning of the blocking phase of the bipolar transistor Q2, while the falling edge of the trapezoidal inverter output voltage forms at the beginning of the blocking phase of the bipolar transistor Q1.

The entire switching-off signal is present at the centre tap V of the differentiating element and is composed additively of the voltage drop across the capacitor C5 and the voltage drop across the resistor R14. The switching-off signal present at the tap V is fed via the lowpass filter R15, C7, the rectifier diode D7 and the Zener diode D8 to the bistable switching device. The Zener diode D8 and the aforementioned components of the error monitoring element are dimensioned such that in normal operation the critical threshold voltage of the Zener diode D8, which is approximately 27 V, is undershot and the bistable switching device remains deactivated. An anomalous operating state, which is caused, for example, by a defective lamp or by a lamp with an operating voltage increased owing to age has an increased voltage drop at the capacitor C5 as a consequence. The positive voltage peaks of the switching-off signal, which are formed by the positive half waves, added to the capacitor voltage at C5, of the square-wave voltage of the differentiating element then overshoot the threshold voltage of the Zener diode D8 and activate the bistable switching device, which then controls the field-effect transistor T1 and thus also the base-emitter circuit of the bipolar transistor Q2 to be of high resistance. The half-bridge inverter is therefore shut down and cannot be restarted until renewed switching on or by exchanging the defective lamp.

The bistable switch-off device comprises two bipolar transistors Q3, Q4, resistors R16, R17, R18, R19 and a capacitor C8, which form an equivalent thyristor circuit. The mode of operation of an equivalent thyristor circuit comprising two bipolar transistors is described, for example, on pages 395 to 396 in the book "Bauelemente der Elektronik und ihre Grundschaltungen" ("Electronic components and their basic circuits") by H. Höger, F. Kähler, G. Weigt from the series "Einführung in die Elektronik" ("Introduction to electronics") Vol. 1, Verlag H. Stam GmbH, 7th edition. In normal operation, the two bipolar transistors Q3, Q4 are blocked, and the bistable switching device is deactivated, with the result that the drain-source junction of the field-effect transistor T1 is switched on via the closing resistor R11 and the diode D4, that is to say remains of low resistance. After the occurrence of an anomalous operating state, the switching-off signal overshoots the threshold voltage of the Zener diode D8 and toggles the transistors Q3, Q4 into the on state. As a result, the gate of the field-effect transistor T1 is connected via the diode D5 and the collector-emitter junction, now conductive, of the transistor Q4 to the negative pole of the inverter direct voltage supply. The field effect transistor T1 thus changes into the blocking state, that is to say its drain-source junction, and thus also the base-emitter circuit of the inverter transistor Q2 become highly resistive and cause the inverter to be switched off. The capacitor C5 of the switch-off device is discharged via the high-resistance resistor R20 connected in parallel. Suitable dimensioning of the components used is specified in the table.

Figure 2:
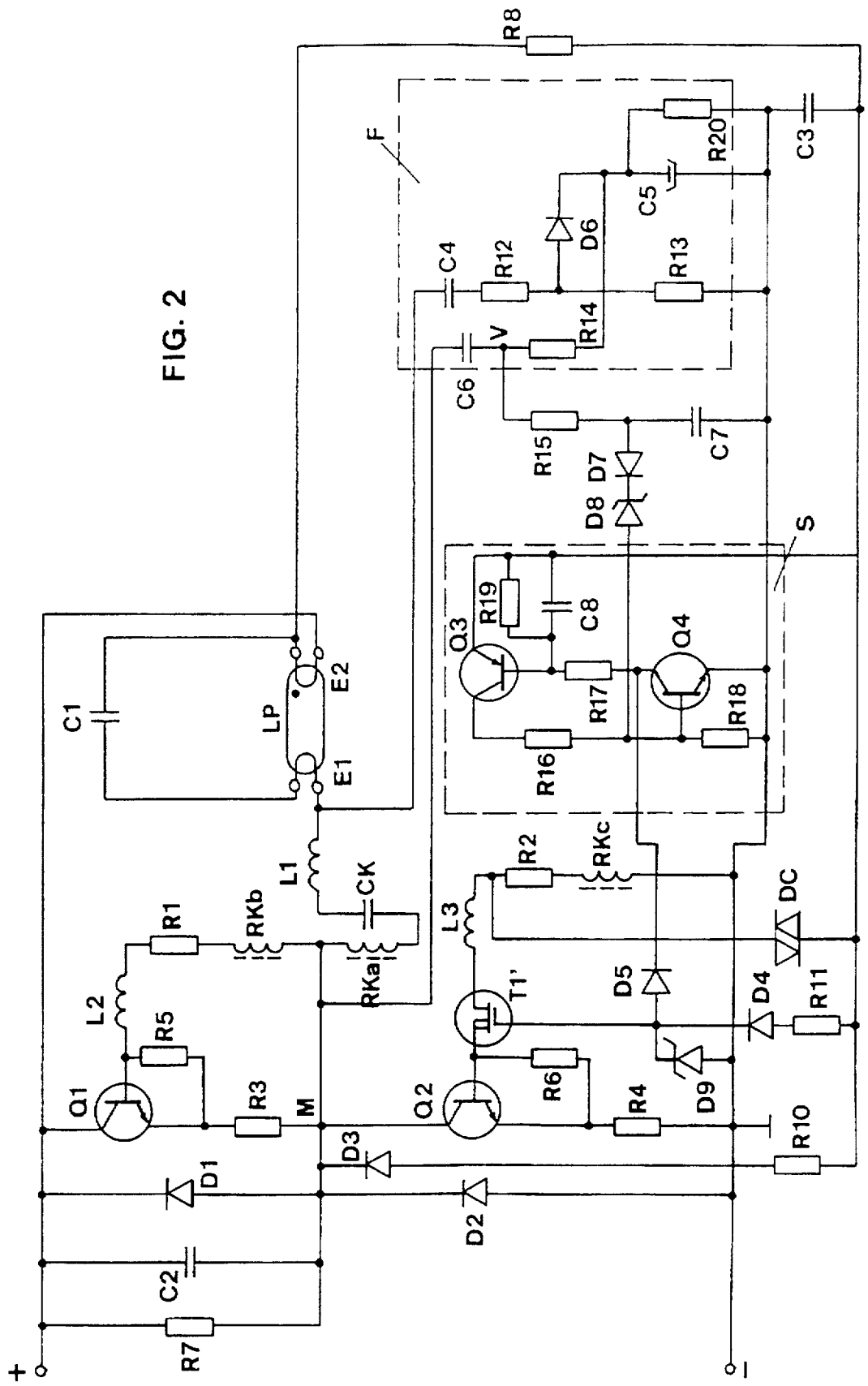
FIG. 2 shows a sketched circuit diagram of the circuit arrangement according to the invention in accordance with the second exemplary embodiment.

The second exemplary embodiment, represented in FIG. 2, of the invention differs from the first exemplary embodiment only in the field-effect transistor T1' of the switch-off device. The field-effect transistor T1' of the switch-off device in accordance with the second exemplary embodiment is arranged in the base line of the inverter transistor Q2, while in the first exemplary embodiment the field effect transistor T1 of the switch-off device is arranged in the emitter line of the inverter transistor Q2. In this case, the source terminal of the field effect transistor T1' is directly connected to the base terminal of the bipolar transistor Q2, while its drain terminal is connected to the inductor L3. The base-emitter circuit of the bipolar transistor Q2 here contains the secondary winding RKc of the toroidal-core transformer, the base series resistor R2, the inductor L3, the drain-source junction of the field-effect transistor T1', the base-emitter junction of the bipolar transistor Q2 and the emitter resistor R4.

The field-effect transistor T1' is controlled to be of low resistance when switching on the circuit arrangement via the closing resistor R11 and the diode D4, which is led to the gate of the field effect transistor T1', before starting the inverter. The gate of the field effect transistor T1' is, furthermore, connected via the diode D5 to the output of the bistable switching device S, whose input is connected, for its part, to the output of the error monitoring element F, which is connected in parallel with the lamp LP in terms of alternating current. Connected in parallel with the gate-source junction of the field effect transistor T1' is a Zener diode D9 which limits the voltage drop to approximately 12 V. The aforementioned bistable switching device S and the error monitoring element F are constructed in a fashion identical to the similarly denoted components of the first exemplary embodiment and also have the same mode of operation. In the case of an anomalous operating state, they control the field effect transistor T1, and thus also the base-emitter circuit of the inverter transistor Q2, to be of high resistance. The oscillation of the half-bridge inverter is thereby interrupted. Switching off is performed synchronously with the blocking phase of the switching transistor Q2, as has already been explained when describing the first exemplary embodiment.

The remaining components, not yet mentioned, of the second exemplary embodiment correspond to the similarly denoted components of the first exemplary embodiment. The mode of operation of these components also corresponds to the mode of operation of the corresponding components of the first exemplary embodiment.

The invention is not restricted to the exemplary embodiments described in detail above. For example, it is also possible to use a thyristor or a flip flop as bistable switch-off device. However, the circuit arrangement can have a heating circuit for preheating the electrode filaments E1, E2 of the lamp LP in parallel with the lamp LP. The circuit arrangement according to the invention is, moreover, also suitable for operating a plurality of lamps connected in series.

TABLE

Dimensioning of the electronic components; illustrated in the figures, in accordance with the preferred exemplary embodiments

| R1, R2 | 8.2 Ω |
|---|---|
| R3 | 0.47 Ω |
| R4 | 0.39 Ω |
| R5, R6 | 33 Ω |
| R7 | 3.3 MΩ |
| R8 | 1.12 MΩ |
| R10 | 22 kΩ |
| R11 | 330 kΩ |
| R12 | 978 kΩ |
| R13 | 100 kΩ |
| R14 | 20 Ω |
| R15 | 2.2 kΩ |
| R16, R17, R18, R19 | 10 kΩ |
| R20 | 4.7 MΩ |
| C1 | 7.5 nF |

TABLE-continued

Dimensioning of the electronic components; illustrated in the figures, in accordance with the preferred exemplary embodiments

| C2 | 1.5 nF |
|---|---|
| C3 | 100 nF |
| C4 | 100 pF |
| C5 | 1 µF |
| C6 | 33 pF |
| C7, C8 | 560 pF |
| CK | 330 nF |
| L1 | 1.25 mH |
| L2, L3 | 4.7 µH |
| D1, D2, D3 | 1N4946GP |
| D4, D5, D6, D7 | LL4148 |
| DC | 1N413M |
| Q1, Q2 | BUF644 |
| Q3 | BC857A |
| Q4 | BC847A |
| T1, T1' | STK14N05 |
| RK | Toroidal core R 8/4/3.8 |

I claim:

1. A circuit arrangement for operating electric lamps, the circuit arrangement having the following features:

an inverter with at least two alternating switching transistors (Q1, Q2), a drive device for the switching transistors (Q1, Q2) of the inverter, a switch-off device which has a switch-off transistor (T1, T1') by means of which the inverter (Q1, Q2) is switched off after the occurrence of an anomalous operating state, characterized in that a switching junction of the switch-off transistor (T1, T1') is arranged in the control circuit of a switching transistor (Q2) of the inverter, the switching junction of the switch-off transistor (T1, T1') being of low resistance in normal operation of the inverter and of high resistance after the occurrence of an anomalous operating state of the inverter, the switch-off device having an error signal monitoring element (F) connected dynamically in parallel to the electric lamps for monitoring the voltage drop across the lamps.

2. The circuit arrangement for operating electric lamps according to claim 1, characterized in that the switch-off transistor (T1, T1') is a field-effect transistor.

3. The circuit arrangement for operating electric lamps according to claim 1, characterized in that the switching junction of the switch-off transistor (T1) is arranged in the emitter line of the switching transistor (Q2) of the inverter.

4. The circuit arrangement for operating electric lamps according to claim 1, characterized in that the switching junction of the switch-off transistor (T1') is arranged in the base line of the switching transistor (Q2) of the inverter.

5. The circuit arrangement for operating electric lamps according to claim 1, characterized in that the switch-off device has a bistable switching device (S) whose input is driven by the error signal monitoring element (F) via a trigger (D8) and/or a time-delay switch, and whose output is connected to the control electrode of the switch-off transistor (T1, T1').

6. The circuit arrangement for operating electric lamps according to claim 1, characterized in that the error signal monitoring element (F) has a synchronization device which synchronizes the switch-off device with the operating cycle of the inverter (Q1, Q2).

7. The circuit arrangement for operating electric lamps according to claim 6, characterized in that a synchronization device is connected to a centre tap (M) between the switching transistors (Q1, Q2) of the inverter and, via a trigger (D8) and/or time-delay switch, to the input of the bistable switching device (S).

8. The circuit arrangement for operating electric lamps according to claim 1, characterized in that there are connected downstream of the error signal monitoring element (F) a RC lowpass filter (R15, C7) and a rectifier diode (D7) via which the output of the error signal monitoring element (F) is connected to the input of a bistable switching device (S) and to the synchronization device.

9. The circuit arrangement for operating electric lamps according to claim 1, characterized in that the error signal monitoring element (F) has at least one capacitor (C5) at which a direct voltage is present which is proportional to the averaged, rectified lamp voltage.

10. The circuit arrangement for operating electric lamps according to claim 9, characterized in that the error signal monitoring element (F) has a capacitor (C5), a rectifier diode (D6) and an RC integration element (R12, C4).

11. The circuit arrangement for operating electric lamps according to claim 5, characterized in that the bistable switching device (S) is an equivalent thyristor circuit having two transistors (Q3, Q4).

12. The circuit arrangement for operating electric lamps according to claim 5, characterized in that the bistable switching device has a thyristor.

13. The circuit arrangement for operating electric lamps according to claim 5, characterized in that the bistable switching device has a flip flop.

14. The circuit arrangement for operating electric lamps according to claim 7, characterized in that the synchronization device has a CR series circuit which comprises at least one capacitor (C6) and one resistor (R14).

15. An operating method for electric lamps in a circuit arrangement which has an inverter with at least two alternatingly switching transistors (Q1, Q2), a drive device for the transistors (Q1, Q2) of the inverter, as well as a switch-off device which has a switch-off transistor (T1, T1'), by means of which the inverter is switched off after the occurrence of an anomalous operating state, characterized in that the switching junction of the switch-off transistor (T1, T1') is arranged in a control circuit of an inverter switching transistor (Q2), the switching junction of the switch-off transistor (T1, T1') being of low resistance in normal operation and is controlled to be of high resistance with the aid of a switch-off signal after the occurrence of an anomalous operating state of the electric lamps and synchronously with a blocking phase of the inverter switching transistor (Q2).

16. The operating method according to claim 15 characterized in that the switch-off signal is formed by two superimposed voltage components, the first voltage component being a direct voltage which is proportional to the lamp voltage, and the second voltage component being proportional to the temporal change in the voltage at a centre tap (M) of the inverter switching transistors (Q1, Q2)—that is to say, proportional to the time derivative of the inverter output voltage.

17. The operating method according to claim 15, characterized in that the switch-off signal of a control electrode of the switch-off transistor (T1, T1') is fed via a trigger (D8) with a downstream bistable switching device (S).

* * * * *